United States Patent [19]

Sakairi et al.

[11] Patent Number: 5,453,332
[45] Date of Patent: Sep. 26, 1995

[54] ELECTRODE STRUCTURE FOR FUEL CELL

[75] Inventors: Koichi Sakairi, Kanagawa; Masahiro Watanabe, No. 2412-8, Wadamachi, Kofu-shi, Yamanashi, both of Japan

[73] Assignees: Tanaka Kikinzoku Kogyo K.K., Japan; Stonehart Associates Inc., Madison, Conn.; Masahiro Watanabe, Japan

[21] Appl. No.: 125,636

[22] Filed: Sep. 22, 1993

[30] Foreign Application Priority Data

Sep. 22, 1992 [JP] Japan .................................. 4-277958

[51] Int. Cl.[6] .................................................. H01M 4/96
[52] U.S. Cl. .................................................. 429/40; 429/42
[58] Field of Search .................. 429/42, 40, 44, 429/45; 252/502, 503; 423/445; 502/101

[56] References Cited

U.S. PATENT DOCUMENTS 3,252,839  5/1966  Langer et al. .......................... 429/42
3,322,576  5/1967  Young .................................... 429/42
3,531,329  9/1970  Selwitz .................................. 429/42
3,676,222  7/1972  Deibert .................................. 429/42
4,293,396  10/1981  Allen et al. ........................ 429/44 X Primary Examiner—Anthony Skapars
Attorney, Agent, or Firm—Klauber & Jackson

[57] ABSTRACT

Disclosed is an electrode structure for fuel cell having a carbon support of which an apparent density is between 0.05 g/cm$^3$ and 1.2 g/cm$^3$.

In this electrode structure, the sufficient diffusion of gases can be secured because the sufficient cavities are securely formed in the catalyst electrode layer by the carbon support having a smaller apparent density or a larger porosity even if the thickness of the catalyst electrode layer increases.

6 Claims, No Drawings

ELECTRODE STRUCTURE FOR FUEL CELL

BACKGROUND OF THE INVENTION

The present invention relates to an electrode structure for fuel cell which can produce a high current density.

A solid polymer electrolyte fuel cell attracts more attention as an electronic power source of an electric automobile and a space craft compared with a phosphoric acid fuel cell because it is compact and may produce a high current density. In the development of this technical field, various electrode structures, methods of preparing a catalyst and system constructions have been proposed.

A general electrode structure of fuel cell is constructed by integrating, by means of hotpressing, an electrode substance which is prepared by mixing support particles formed by supporting catalyst particles such as platinum on such a carbon support as carbon black with an ionic conductive substance as such Nafion (trademark of Du Pont), with current collectors and an ion exchange membrane to form a sandwich structure consisting of a cathode current collector, a cathode, a solid polymer electrolyte, an anode and an anode current collector.

One of the essential factors required for a fuel cell is to produce a high current density. The density (apparent density) of the carbon support in the catalyst electrode layer of a conventional fuel cell has been over 1.2 g/cm$^3$. This is because the bulk density of the carbon support employed is high, and the pressure of the hotpressing is also high. When the bulk density of the carbon support in the electrode is high, the volume of cavities in the electrode decreases so that the high current density cannot be disadvantageously obtained. In order to overcome this disadvantage so as to secure sufficient diffusion, the thickness of the electrode has been made thinner, but this method may cause another disadvantage that the absolute amount of the catalyst which participates in an electrode reaction becomes insufficient even if the diffusion can smoothly occur because the supporting amount of the catalyst such as platinum decreases. While the amount of the ionic conductive polymer is required to be increased for elevating the utilization rate of the catalyst, the cavities in the electrode disadvantageously decrease when the addition amount increases.

SUMMARY OF THE INVENTION

In view of the above drawbacks, an object of the present invention is to provide an electrode structure for fuel cell which enables the production of current at a sufficiently high current density by securing sufficient gas diffusion even if the amount of an ionic conductive polymer increases without thinning of the electrode thickness(es).

The present invention is an electrode structure for fuel cell which comprises a carbon support supporting a catalyst metal and an ionic conductive solid polymer adhering to the carbon support wherein the apparent density of the carbon support in the electrode structure is between 0.05 g/cm$^3$ and 1.2 g/cm$^3$.

The apparent density of the carbon support can be maintained in the said specific range by employing carbon black having a small bulk density as the carbon support, or controlling the amount of the substance such as the ionic conductive solid polymer other than the carbon support or controlling the pressure of hotpressing for constituting the above structure by means of integrating the catalyst metal electrode layer, current collectors and an ion exchange membrane. This control may be preferably conducted by adjusting the bulk density of the carbon support employed, and in most cases the apparent density of the carbon support in the catalyst electrode layer can be maintained in the above range by employing carbon supports for which a bulk density is between 0.05 g/cm$^3$ and 0.3 g/cm$^3$.

All the catalyst surface may be coated by making the amount of the ion exchange resin with respect to the carbon support in the range between 1:9 and 6:4, thereby facilitating the smooth transfer of protons to permit the effective utilization of the catalyst even if the thick electrode is employed.

Since sufficient cavities are securely formed in the catalyst electrode layer in the electrode structure for fuel cell, the prevention of the gas diffusion of a reactant and a reaction product in the catalyst electrode layer seldom occurs so that current can be produced at the sufficiently high current density. Accordingly, even if the catalyst electrode layer is made thicker, the diffusion of the gases and the transfer of the proton at sufficient rate take place so that the amount of the current produced can be increased by increasing the supported catalyst amount by means of thickening the catalyst electrode layer. Especially in the electrode structure for fuel cell in accordance with the present invention, the more the supported amount of the catalyst metal becomes, the more the ratio of the current density increases so that higher currents can be produced.

DETAILED DESCRIPTION OF THE INVENTION

The electrode structure for fuel cell is characterized in that the apparent density of the electrode structure, that is, the value obtained by dividing the weight of the carbon support in the catalyst electrode layer by the volume of the catalyst electrode layer, is between 0.05 g/cm$^3$ and 1.2 g/cm$^3$. The apparent density of a conventional electrode structure for fuel cell is over 1.2 g/cm$^3$ as mentioned earlier. The reasons for such a large apparent density may be ① the bulk density of carbon particles employed as raw material is high, ② the pressure of hotpressing is high so that the carbon particles are likely to be compressed and ③ the ratio of the carbon particles mixed with the ionic conductive solid polymer (especially perfluorocarbon type polymer) is high and the like. Little attention has been conventionally paid to these drawbacks so that the improvement of the performance of a fuel cell has relied on selection of the catalyst metal and of the support material.

As mentioned, the material itself constituting the electrodes of the fuel cell of the present invention may be the same as the conventional ones. The sufficient cavities in the catalyst electrode layer can be secured even when 10 to 60% of the ion exchange resin with respect to the carbon support is added by appropriately solecting the properties of the above material or controlling the mixing ratio thereof to maintain the apparent density of the carbon support in the catalyst electrode layer in a relatively small range for elevating the porosity of the catalyst electrode layer. Thereby, the gas diffusion of the reactant and the reaction product in the catalyst electrode layer is secured even if the catalyst layer is made thicker so that the thickness of the catalyst electrode layer can be arbitrarily determined depending on its use without considering the gas diffusion, and the utilization rate of the catalyst can be raised.

The apparent density of the carbon support in the catalyst electrode layer of the electrode structure in accordance with the invention is between between 0.05 g/cm$^3$ and 1.2 g/cm$^3$.

Around the upper limit of 1.2 g/cm³, the influences of the apparent density of the carbon support to the current density and to the activities begin to appear, and below the lower limit of 0.05 g/cm³ the electrical contact among the carbon supports is insufficient to lower the catalyst utilization rate. The ratio of ion exchange resin with respect to the carbon support in the present invention is preferably made to be between 1:9 and 6:4. Below the lower limit, the catalyst utilization rate is lowered because the proton transfer in the electrode is depressed and the catalyst may not be completely coated, and over the upper limit the gas diffusion to the catalyst surface may be prevented because the coating thickness of the ion exchange resin is too thick.

EXAMPLES

Although Examples of the electrode structure for fuel cell in accordance with the present invention will be illustrated, these are not construed to restrict the invention.

Example 1

After 10 g of carbon powder having an apparent density of 0.2 g/cm³ was impregnated with a chloroplatinic acid aqueous solution (platinum concentration: 5 g/liter), a platinum-carbon support of which a platinum support amount was 30% in weight was prepared by reduction treatment. The carbon support was impregnated with a commercially available ion exchange resin dispersion solution [Nafion (trademark of Du Pont) solution] and was dispersed with a ultrasonic homogenizer. Thereafter, the carbon support was dried at 50° to 100° C. to form an ion exchange resin layer on the surface of the support (Nafion: carbon support=1:1). This catalyst powder was fractionated so that the average platinum supporting amount became 0.25 mg/cm³, and the fractionated powder was then redispersed in alcohol.

Then, the dispersion was filtered under weak suction to adhere the catalyst powder on two filter papers of which a diameter was 50 cm with a small amount of the alcohol remaining on the filter paper. The two filter papers positioned at both surfaces of Nafion 115 (made by Du Pont) which was a perfluorocarbon type ion exchange membrane were hotpressed at 130° C. and 5 kg/cm² with the membrane and a hydrophobically treated carbon paper of which a diameter was 20 cm and a thickness was 360 μm functioning as a current collector to prepare an electrode equipped with the current collector having a cathode with a thickness of 10 μm on one surface and an anode with a thickness of 10 μm on the other surface. The apparent densities of the carbon supports in the anode and the cathode of the electrode thus prepared were 0.64 g/cm³.

Further, another electrode structure for fuel cell having an anode and a cathode with thicknesses of 40 μm of which an average supporting amount of platinum was about 1 mg/cm³ was prepared by controlling the supporting amount of the carbon powder on the filter papers.

The performances of these two electrodes for fuel cell having different thicknesses were evaluated under the following conditions. The current densities of IR free at 80° C. and 0.7 V were measured when humidified hydrogen and humidified oxygen at 90° C. at 1 atm. were employed as supply gases to the anode and the cathode, respectively. The current density of the electrode having the thickness of 10 μm was 0.51 A/cm², and that of 40 μm was 1.1 A/cm². From these values, the respective activities per 1 g of platinum were calculated to be 2020 A/g for the electrode of 10 μm and 1100 A/g for the electrode of 40 μm.

Comparative Example 1

Catalyst power of which an average amount of supported platinum was 0.25 mg/cm³ was prepared under the same conditions as those of Example 1 employing a carbon support having a bulk density of 0.4 g/cm³.

The catalyst powder was adhered to filter papers which were then firmly contacted on both surfaces of Nafion 115 and hotpressed at 130° C. and a presure of 5 kg/cm² to prepare an electrode for fuel cell having an anode with a thickness of 4 μm on one surface and a cathode with a thickness of 4 μm on the other surface in accordance with the same procedures as those of Example 1. The apparent densities of the carbon supports in the anode and the cathode of the electrode thus prepared were 1.5 g/cm³.

Further, another electrode structure for fuel cell having an anode and a cathode with thicknesses of 17 μm of which an average supporting amount of platinum was about 1 mg/cm³ was prepared by controlling the supporting amount of the carbon powder on the filter papers.

The performances of these two electrodes for fuel coil having different thicknesses were evaluated in accordance with the same procedures as those of Example 1. The current density of the electrode having the thickness of 4 μm was 0.42 A/cm², and that of 17 μm was 0.5 A/cm². From these values, the respective activities per 1 g of platinum were calculated to be 1680 A/g for the electrode of 4 μm and 510 A/g for the electrode of 17 μm.

The bulk densities of the carbon supports, the electrode thicknesses, the apparent densities of the carbon support in the electrodes, the current densities and the activities of the electrodes of Example 1 and Comparative Example 1 are summarized in Table 1.

TABLE 1

| | Example 1 Electrode Thickness | | Comparative Example 1 Electrode Thickness | |
|---|---|---|---|---|
| | 10 μm | 40 μm | 4 μm | 17 μm |
| Bulk Density of Support | 0.2 g/cm³ | 0.2 g/cm³ | 0.4 g/cm³ | 0.4 g/cm³ |
| Pt Support Amount | 0.25 mg/cm² | 1 mg/cm² | 0.25 mg/cm² | 1 mg/cm² |
| Apparent Density of Support | 0.64 g/cm³ | 0.64 g/cm³ | 1.5 g/cm³ | 1.5 g/cm³ |
| Current Density | 0.51 A/cm² | 1.1 A/cm² | 0.42 A/cm² | 0.51 A/cm² |
| Activity per 1 g-Pt | 2040 A/g | 1100 A/g | 1680 A/g | 510 A/g |

It can be seen from Table 1 that the current density of the electrode of Example 1 having the carbon support of which a bulk density is 0.2 g/cm³ in case of the platinum supported amount of 0.25 mg/cm² is 0.51 A/cm² which is higher the current density of 0.42 A/cm² of Comparative Example 1 having the carbon support of which a bulk density is 0.4 g/cm³. It can be also seen that the current density of the electrode of Example 1 in case of the platinum supported amount of 1 mg/cm² is 1.1 A/cm² which is much higher than the current density of 0.51 A/cm² of Comparative Example 1, and the amount of the current produced remarkably increases so that the activity per 1 g of Pt also increases.

Example 2

A fuel cell was prepared in accordance with the same procedures as those of Example 1 except that the apparent densities of the anode support and the cathode support in the catalyst electrode layer were 0.1 g/cm$^3$ and the thickness of the catalyst electrode layer was 58 μm.

The current density and the activity per 1 g-platinum of this electrode were calculated under the same conditions as those of Example 1 to be 0.50 A/cm$^3$ and 2000 A/g, respectively.

Example 3

A fuel cell was prepared in accordance with the same procedures as those of Example 1 except that the apparent densities of the anode support and the cathode support in the catalyst electrode layer were 1.20 g/cm$^3$ and the thickness of the catalyst electrode layer was 10 μm.

The current density and the activity per 1 g-platinum of this electrode were calculated under the same conditions as those of Example 1 to be 0.87 A/cm$^3$ and 1740 A/g, respectively.

Example 4

A fuel cell was prepared in accordance with the same procedures as those of Example 1 except that the the ratio of the Nafion and the carbon support was 1:9 and the thickness of the catalyst electrode layer was 40 μm.

The current density and the activity per 1 g-platinum of this electrode were calculated under the same conditions as those of Example 1 to be 0.63 A/cm$^3$ and 630 A/g, respectively.

Example 5

A fuel cell was propared in accordance with the same procedures as those of Example 4 except that the the ratio of the Nafion and the carbon support was 6:4.

The current density and the activity per 1 g-platinum of this electrode were calculated under the same conditions as those of Example 1 to be 0.85 A/cm$^3$ and 850 A/g, respectively.

What is claimed is:

1. An electrode structure for a fuel cell which comprises a carbon support supporting a catalyst metal and an ionic conductive solid polymer adhering to the carbon support wherein the apparent density of the carbon support in the electrode structure is between about 0.05 g/cm$^3$ and 1.2 g/cm$^3$.

2. The electrode structure as claimed in claim 1, wherein the apparent density of the carbon support is between 0.05 g/cm$^3$ and 0.3 g/cm$^3$.

3. The electrode structure as claimed in claim 1, wherein the ratio of the ionic conductive solid polymer with respect to the carbon support is between 1:9 and 6:4.

4. The electrode structure as claimed in claim 1, wherein the thickness of the catalyst electrode layer is between 6 and 80 μm.

5. An electrode structure for a fuel cell which comprises a carbon support supporting a catalyst metal an ionic conductive solid polymer adhering to the carbon support, wherein the apparent density of the carbon support in the electrode structure is between 0.05 g/cm$^3$ and 0.64 g/cm$^3$ and the ratio of the ionic conductive solid polymer with respect to the carbon support is between 1:9 and 6:4.

6. The electrode structure as claimed in claim 5, wherein the thickness of the catalyst electrode layer is between 6 and 80 μm.

* * * * *